United States Patent [19]

Ahad

[11] 4,309,001
[45] Jan. 5, 1982

[54] AUTOMATIC LOCKING RETRACTOR MECHANISM WITH UNITARY PAWL CONTROL

[75] Inventor: Munir J. Ahad, Valencia, Calif.

[73] Assignee: American Safety Equipment Corporation, Detroit, Mich.

[21] Appl. No.: 125,789

[22] Filed: Feb. 29, 1980

[51] Int. Cl.³ .................. A62B 35/00; B65H 75/48
[52] U.S. Cl. ........................................ 242/107.4 D
[58] Field of Search ............... 242/107.4 R–107.4 E, 242/107.6, 107.7; 280/806, 807; 297/478, 480, 475–477

[56] References Cited

U.S. PATENT DOCUMENTS

| | | | |
|---|---|---|---|
| 3,174,704 | 3/1965 | Repogle | 242/107.4 D |
| 3,412,952 | 11/1968 | Wohlert et al. | 242/107.4 D |
| 3,659,801 | 5/1972 | Romanzi | 242/107.4 D |
| 3,667,698 | 6/1972 | Fisher | 242/107.4 D |

*Primary Examiner*—John M. Jillions
*Attorney, Agent, or Firm*—Poms, Smith, Lande & Rose

[57] ABSTRACT

An emergency locking safety seat belt retractor for restraining passengers in a vehicle has a seat belt wound upon a spool biased toward a fully wound condition, a pawl and ratchet means operable in response to vehicle deceleration to lock the spool against belt unwinding movement and a unitary pawl control means carried by a helically threaded shaft mounted on the retractor frame and rotatably driven by protractive and retractive rotation of the spool to inhibit pawl and ratchet locking of the spool in predetermined manner in response to both the direction of rotation of the spool and the amount of protractive rotation of the spool as the seat belt is placed in use.

7 Claims, 9 Drawing Figures

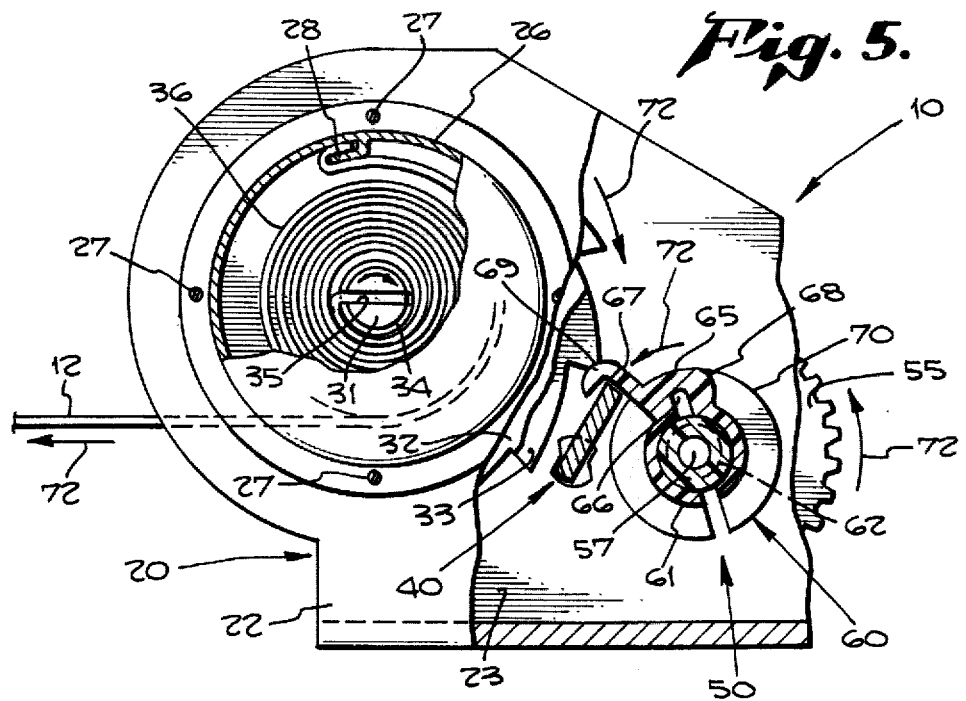
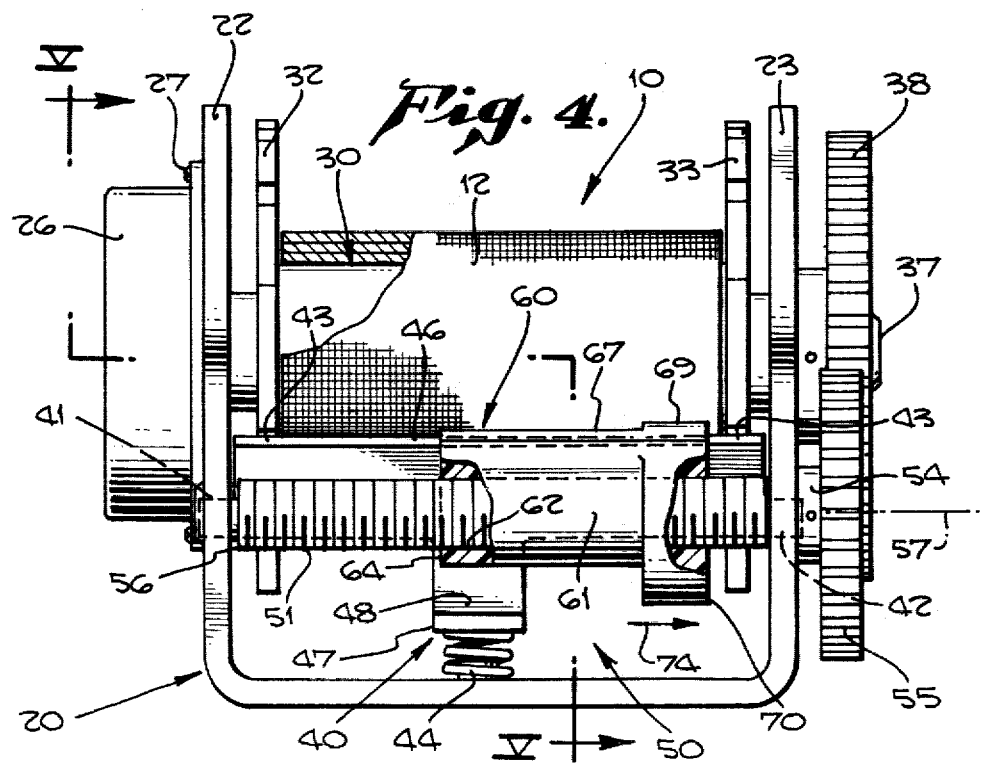

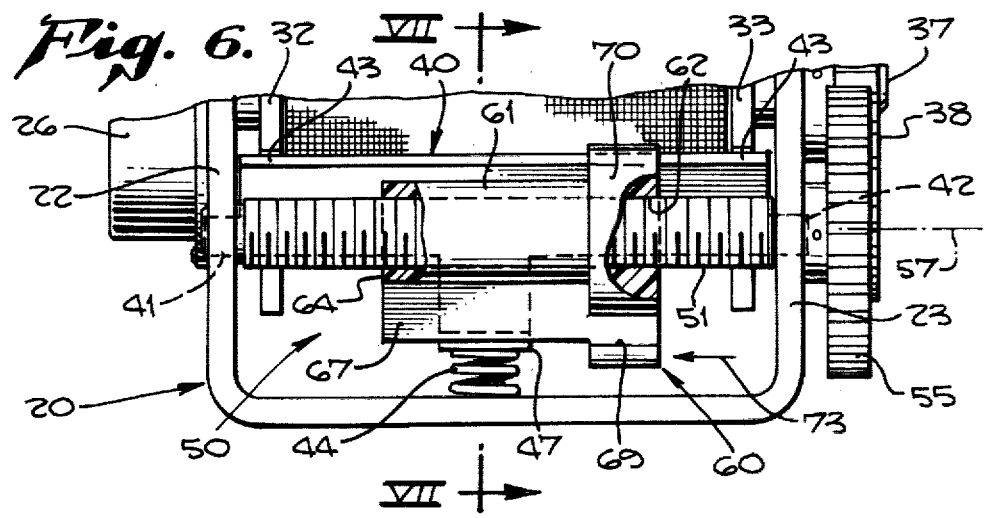
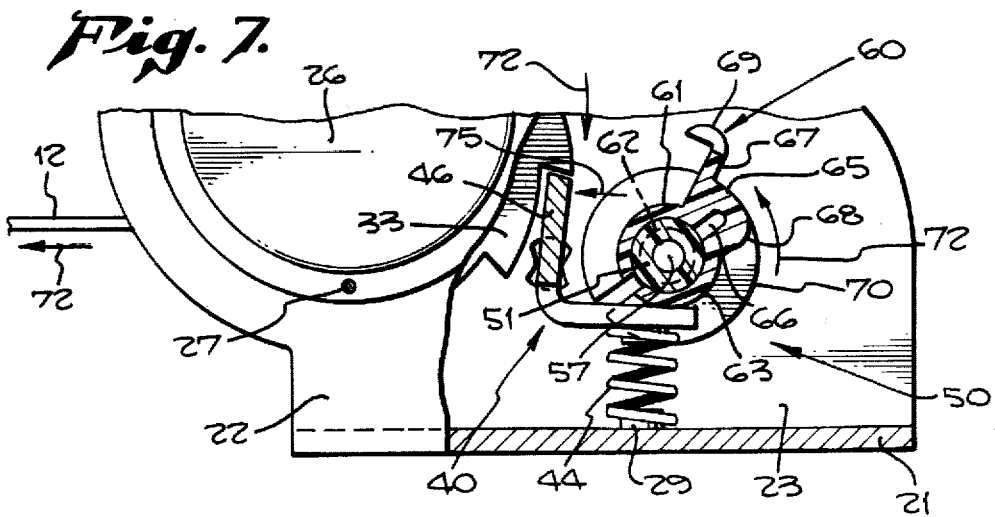
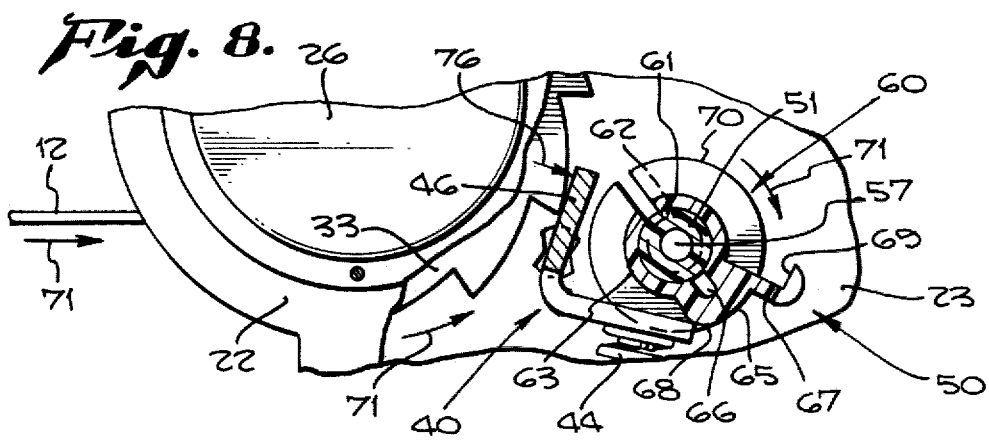

AUTOMATIC LOCKING RETRACTOR MECHANISM WITH UNITARY PAWL CONTROL

BACKGROUND OF THE INVENTION

This invention relates generally to retractable locking safety belts and more specifically to an improved lockup control for a pawl and ratchet type seat belt retractor lockup mechanism.

Seat belt mechanisms tend to fall within three distinct categories. First is the category of "web sensitive" retractors wherein the belt is normally in an unlocked but retractively biased condition whereby sudden protractive movement of the belt results in lockup preventing further protraction thereby restraining the passenger. The second type is generally referred to as "vehicle sensitive" in which the normally unlocked belt is locked up in response to sudden vehicle acceleration or deceleration to prevent further protraction of the belt thereby restraining the passenger. In this type of retractor the vehicle accelerations and decelerations are sensed by a pendulum or other type of inertial mass. The third category of retractors, which includes the present invention, are normally-locked in that the retractor mechanism allows belt protraction sufficient for the belt to extend across the torso of the passenger and be buckled, subsequent retraction in response to a retractor spool biasing spring to allow the belt to become snugly fitted to the torso of the passenger, and then locked against further protraction thereby providing continuous restraint to the passenger until such time as the belt is unbuckled.

The prior art in this third category consists of mechanisms that accomplish this initial protraction, retraction and locking function. Until the present invention this has been accomplished by the use of two separate means. The first means senses the direction of rotation of the seat belt spool, and operates to allow unrestricted retractive rotation of the spool by inhibiting locking engagement of the pawl and ratchet assembly. This first means does not inhibit locking engagement during protractive rotation of the spool thus allowing passenger restraining lock-up. Since this first means acts as a one-way gate to rotative motion of the spool, a second, independent means has been provided to augment the operation of said first means and allow protractive rotation to be initiated whenever the belt is in a fully retracted condition. Together, these two means permit a full cycle of belt positioning.

U.S. Pat. No. 3,174,704 entitled "RESTRAINT APPARATUS", issued to E. H. Replogle on Mar. 23, 1965 and assigned to the common assignee of this invention teaches the use of a ratchet assembly to accomplish lockup. In this assembly, the seat belt retractor includes a retracting spool rotatably journalled in the retractor frame and which windably retracts the seat belt. Fixedly attached to and axially displaced from said spool is a ratchet disc having engageable teeth. Also carried by the frame is a pawl having a limited rotary motion from an unlocked to a locked position whereby the locked position is such that the pawl engages the ratchet teeth of the retractor spool, thereby preventing protractive rotation of said spool. This pawl and ratchet assembly is referred to therein as deactivatable stop means.

A deactivator means is provided in Replogle for inhibiting lockup by lifting the pawl out of engagement with the ratchet disc to the unlocked position in response to retractive rotation of the spool. This construction permits retractive rotation of the spool without either the drag or noise associated with the pawl ratcheting over the teeth of the ratchet disc. The sensing of the direction of spool rotation is accomplished by a combination of friction drum and a deactivator finger portion of the deactivator means. The deactivator finger is rotatable between limits to attain a first, activated position and a second, deactivated position by frictional contact with the friction drum which is integral with the retractor spool. Upon a change in direction of rotation of said spool, said finger tends to move in a coupled fashion with said spool from one of said positions until it acquires the second of said positions. The finger retains the latter position throughout further rotation until such time as the direction of rotation is reversed.

A second deactivator means is provided, known as a sensor means, for sensing the amount of belt retraction by sensing the thickness of the belt winding about the spool. Upon reaching the fully retracted condition, the sensor senses the increased thickness of the belt windings about the spool, lifts the pawl out of engagement with the spool, and thereby allows an initial protractive rotation of the spool from the fully retracted condition.

In operation from the initial fully retracted condition, the Replogle apparatus allows the seat belt to be protracted sufficient to be buckled up, retracted to acquire the proper fit about the torso of the passenger, and then locked against further protraction. The apparatus continues to be locked against further protraction until such time as the belt is unbuckled and again fully retracted onto the retractor spool.

A subsequent patent entitled "SELF-RETRACTING WEBBING ROLLER FOR SAFETY BELTS", U.S. Pat. No. 3,412,952 issued to G. Wohlert et al. on Nov. 26, 1968 and assigned to the common assignee of this application again uses a pawl and ratchet assembly to accomplish lockup against further protraction of the seat belt. Wohlert teaches the use of a control disc adjacent to and in frictional contact with said ratchet disc and having a limited rotation from lockup permitted to lockup inhibited positions. The positions are defined by control disc rotation between stops relative to said ratchet disc whereby portions of the control disc selectively occlude the ratchet teeth preventing the pawl from engaging the ratchet disc. Similar to the deactivator finger and friction drum assembly of the Replogle patent, the Wohlert control disc operates by frictional contact with the spool to produce movement in a coordinated fashion relative to the ratchet disc whenever said spool changes rotative direction.

An independent sensor means similar to that of Replogle is also provided by Wohlert for sensing the amount of seat belt retraction and inhibiting locking engagement of the pawl with the ratchet disc whenever the windings of the belt about said spool exceed a predetermined thickness associated with the substantially fully retracted condition. Accordingly, operation of the Wohlert apparatus is similar to the operation of the Replogle apparatus.

The "LOCKING SEAT BELT RETRACTOR" patent issued to Robert C. Fisher, U.S. Pat. No. 3,667,698 issued June 6, 1972, teaches the use of a turn counting mechanism as an independent means in place of the sensor means for sensing belt winding thickness of the Wohlert and Replogle patents. The Fisher patent teaches the use of a direct drive gear assembly to locate a cam surface in such manner as to inhibit lockup of a pawl with a spool associated ratchet disk during a predetermined range of spool positions corresponding with a specified number of spool rotations from the fully retracted condition. Again, a control disc arrangement similar to that disclosed in Wohlert is disclosed for inhibiting motion of the pawl into locking engagement with the ratchet disc during retractive rotation of said disc by the coordinated rotation of the control disc due to frictional contact with the retractor frame between limits of rotation in the form of stops.

In all of these prior devices, multiple separate, distinct, and independent means were required to control pawl motion from the unlocked to the locked position in response to first, retractive rotation of the retractor spool when the associated safety belt has been protracted to a position of use, and second, protractive rotation of the retractor spool when said protractive rotation is initiated from a substantially fully retracted condition. To my knowledge no means was known prior to the present invention for accomplishing both types of control with a single pawl control means. Accordingly, it is therefore an object of the present invention to provide and disclose a single pawl control means responsive to both the direction of rotation of the spool, when the safety belt has been protracted to a position of use and to the amount of spool rotation during the protractive rotation of said spool from and to a substantially fully belt-retracted condition.

It is another object of the present invention to disclose and provide a unitary pawl control mechanism for determining when the belt is in said substantially fully retracted condition and for sensing the direction of spool rotation when the safety belt has been protracted to a position of use to provide an automatic lockup of an associated safety belt retractor mechanism.

It is a further object of the present invention to disclose and provide a pawl control means as in the foregoing object and that has an economy of moving parts thereby reducing the cost of manufacture.

It is a still further object of the present invention to disclose and provide a pawl control means for an automatic locking retractor with spool position and direction of rotation sensing means that is of simple and reliable construction and operation, thereby minimizing possible modes of failure and the costs of repairs.

SUMMARY OF THE PRESENT INVENTION

In accordance with the above-stated objects, the present invention provides an improved pawl control means for inhibiting locking engagement of the pawl with the ratchet disc during certain specified situations in which lock-up is not desirable. The improved pawl control means includes a pawl control cam element of single piece construction for interactively engaging the pawl to inhibit lock-up in response to both retractive rotation of the spool when the saftey belt has reached a position of use and protractive rotation of the spool when said protractive rotation is initiated from a substantially fully belt-retracted condition. Said cam element is carried by a helically threaded shaft rotatable in response to spool rotation.

Said improved pawl control means utilizes a single cam element to accomplish two modes of operation. From an initial condition in which the seat belt is fully retracted, protraction of the belt to a position of use causes a hook-like portion of the cam element to be rotated by frictional contact with the helically threaded shaft on which it is carried to a position where it retains the pawl out of locking engagement with the spool. Upon a subsequent slight retractive rotation, the pawl control actuates the pawl and ratchet assembly, the first mode of operation, by rotating said hook-like portion away from a position of retaining said pawl in a disengaged position. The unretained pawl may thus cooperatively engage the spool associated ratchet disc, locking it against protraction and providing passenger restraint. Upon further retractive rotation, said pawl control means accomplishes the second mode of operation of deactivating said pawl and ratchet assembly by further rotating said cam surface relative to a cam follower portion of the pawl such that it lifts and thereby retains said pawl in a position disengaged from said spool associated ratchet disc.

A more complete understanding of the improved pawl control means in accordance with the present invention, as well as recognition of additional objects and advantages thereof, will be afforded to those skilled in the art from a consideration of the following drawings and detailed description of a preferred exemplary embodiment of the invention.

BRIEF DESCRIPTION OF THE DRAWINGS

FIG. 4 is a partially cut-away side elevation of the apparatus of FIG. 2 wherein the pawl control means is in a position corresponding with belt protraction to a position of use.

FIG. 5 is an end view of the apparatus of FIG. 4 taken in section along line V—V of FIG. 4.

FIG. 6 is an enlarged partially cut-away side elevation of a portion of the apparatus of FIG. 2 wherein the pawl control means is in a position corresponding with a slight retraction subsequent to the initial protraction to the position of use of FIG. 4.

FIG. 7 is an end view of the apparatus of FIG. 6 taken in section along plane VII—VII of FIG. 6 and shows the pawl control means of the present invention in a position corresponding with retractor lockup preventing belt protraction.

FIG. 8 is an end view of the apparatus of FIG. 6 also taken in section along plane VII—VII of FIG. 6 and shows the pawl control means of the present invention in a position corresponding with retractive rotation from the lock-up position of FIG. 7.

DETAILED DESCRIPTION OF A PREFERRED EXEMPLARY EMBODIMENT

Figure 1:
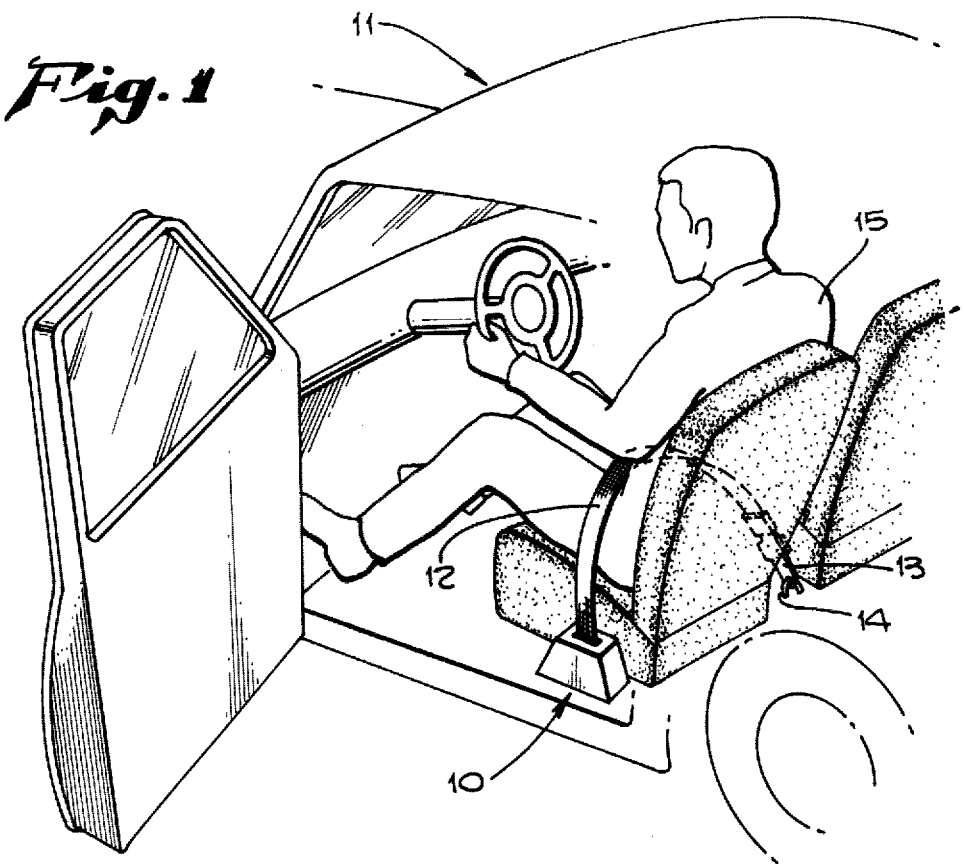
FIG. 1 is a perspective view of a seat belt retractor assembly including the present invention and shows the associated seat belt in a position of use, providing passenger restraint.

Referring generally to FIGS. 1 through 9, an exemplary embodiment of an automatic locking retractor with unitary pawl control means is illustrated. FIG. 1 shows the conventional positioning of a seat belt retractor 10 mounted to a vehicle 11. Said retractor 10 windably carries a seat belt 12 such that a buckle tongue portion of the belt 13 may operably engage a seat belt buckle 14 mounted to the vehicle 11. When so buckled, seat belt 12 is located in a position of use about a passenger 15 such that passenger 15 may be restrained by said belt 12 during an emergency situation.

Figure 3:
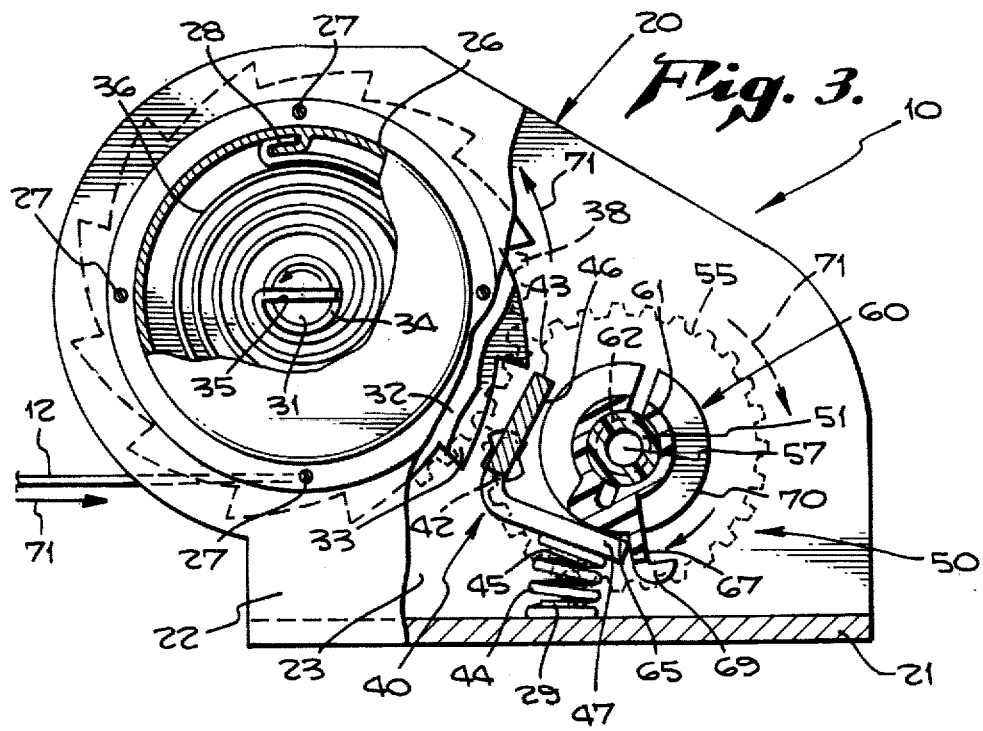
FIG. 3 is an end view of the apparatus of FIG. 2 taken in section along line III—III of FIG. 2.
Figure 2:
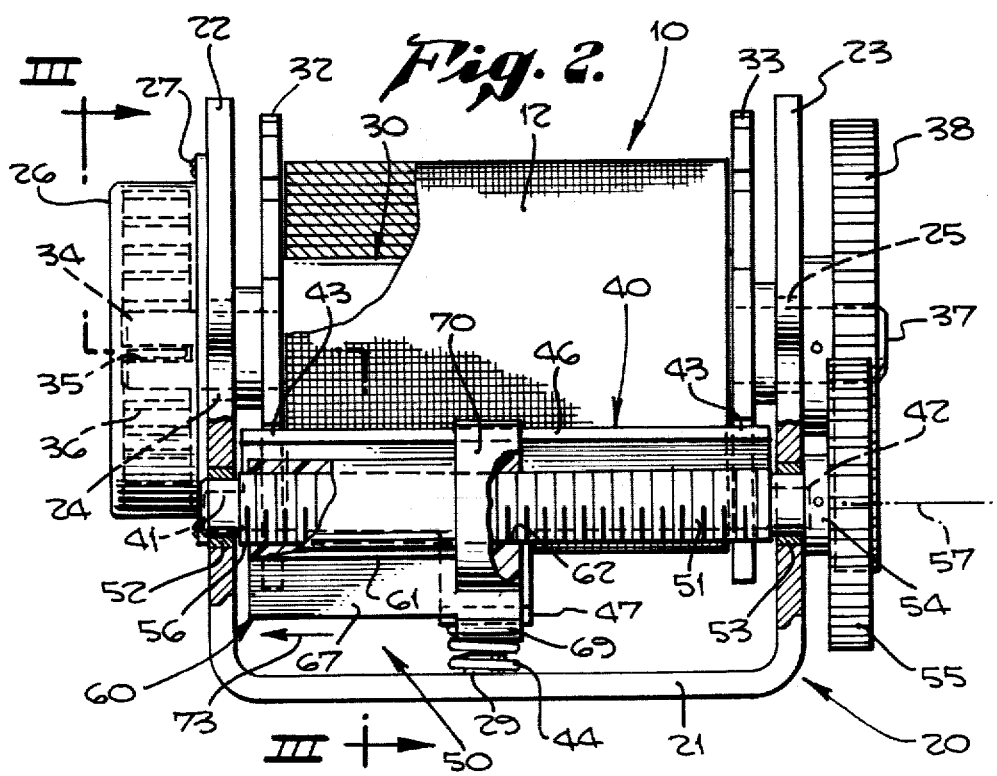
FIG. 2 is a partially cut-away detailed side elevation of the retractor of FIG. 1 and shows the unitary pawl control means of the present invention in a position associated with the belt fully-retracted condition.

Referring to FIGS. 2 and 3, the retractor 10, as is conventional in emergency locking retractors, includes a generally U-shaped frame 20 having base portion 21 and side walls 22 and 23. Said frame carries a seat belt retractor spool 30 fixedly attached to spool shaft 31 which extends through frame side walls 22 and 23, rotatably journalled by respective side wall journals 24 and 25. One end of seat belt 12 is fixedly attached to spool 30 such that said spool, by rotation thereof, may windably retract the belt. Said spool is further provided with multiple-toothed ratchet discs 32 and 33 proximate said seat belt 12 such that said discs 32 and 33 also function as spool side walls. The end of spool shaft 31 extending through frame side wall 22 at side wall journal 24 is referred to as the retractor spring end 34 of the shaft and is provided with a slot 35 for engaging one end of a retractor spring 36. A retractor spring housing 26 is mounted to side wall 22 of frame 20 by mounting means 27 and is further provided with spring attaching means 28 for attaching the other end of retractor spring 36 to said housing 26. So mounted, retractor spring 36 imparts torque to the spring end 34 of shaft 31 to bias retractor spool 30 to rotate in the direction of arrow 71 and thereby windably retract seat belt 12.

The end of shaft 31 opposite the spring end 34 and which extends through frame side wall 23 at journal 25 is referred to as the gear end 37 of the shaft. A driving gear 38 is fixedly attached to gear end 37 and rotatable therewith.

Figure 9:
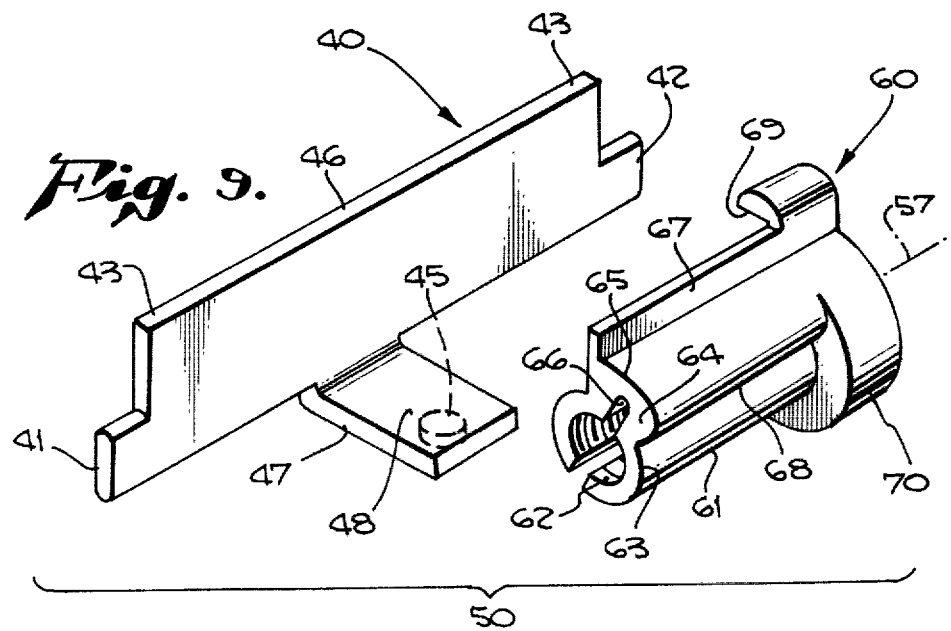
FIG. 9 is a detailed perspective elevation of the disassembled pawl and pawl control means of the apparatus of FIG. 2.

A pawl 40 of a configuration shown in FIG. 9 is carried by frame 20 between side walls 22 and 23 by pawl pivots 41 and 42 such that it has a limited rotation. Said pawl has ratchet engaging portions 43 that are capable of engaging the teeth of the spool associated ratchet discs 32 and 33. Said pawl 40 is further provided with a pawl biasing spring 44 attached to said pawl by spring attaching means 45 and attached to base 21 of frame 20 by spring attaching means 29 such that said spring 44 biases pawl 40 to rotate about pivots 41 and 42 in the direction of arrow 75 of FIG. 7 from a ratchet disengaged position as shown in FIG. 3 to a ratchet engaged position as shown by FIG. 7. When in said ratchet engaged position, ratchet engaging portions 43 are in a position whereby they are capable of engaging ratchet discs 32 and 33 thereby preventing protractive rotation of spool 30. Pawl 40 is further provided with an edge 46 extending between said ratchet engaging portions 43 and with a tongue portion 47; both are interactive with a pawl control means 50 in a manner which will be later described.

Except for driving gear 38, pawl edge 46 and pawl tongue portion 47, the foregoing description is of seat belt retractor components as are conventional in the art.

Pawl control means 50 is comprised of a unitary pawl control cam element 60 carried by a helically threaded shaft 51. Said helically threaded shaft 51 is further defined as a shaft carried by frame 20 such that its axis of rotation 57 is parallel to the axis of rotation of spool 30 and pawl 40. Said helically threaded shaft 51 is rotatably journalled between frame side walls 22 and 23 by side wall journals 52 and 53. The end of the helically threaded shaft 51 proximate the gear end 37 of shaft 31, referred to as the gear end 54 of the threaded shaft, carries a driven gear 55 cooperatively intermeshed with driving gear 38 such that rotation of driving gear 38 in response to rotation of spool 30 produces rotation of driven gear 55, causing rotation of helically threaded shaft 51. For ease of reference, the end of the helically threaded shaft 51 opposite the gear end 54 of said shaft, extending through frame side wall 22, carried by sidewall journal 52, and located proximal to retractor spring 36 shall be referred to as the spring end 56 of the helically threaded shaft 51.

The unitary pawl control cam element 60 has a first cam surface 61 having a roughly cylindrical shape and a bore 62 extending axially therethrough. Said bore 62 is helically threaded such that cam element 60 may be carried by and cooperate with helically threaded shaft 51 in a manner which will be later described.

The tongue portion 47 of pawl 40, also referred to as cam follower portion 47, is further defined as having a cam follower surface 48 which cooperates with pawl control cam element 60 in the manner of a cam and cam follower. In such operation, an increased radius of cam surface relative to the axis of rotation 57 of the helically threaded shaft 51 carrying said cam element 60 operates in opposition to the biasing force of the pawl biasing spring 44 to lift the cam follower portion 47 of the pawl 40 as shown in FIG. 8 thereby causing rotation of the pawl about the pawl pivot points 41 and 42. Said rotation causes the ratchet engaging portion 43 of the pawl to be rotated in the direction of arrow 76 out of engaging relationship with ratchet discs 32 and 33 to the disengaged position of FIG. 3. In accordance with this function, the first cam surface 61 is more specifically defined as a cylindrical surface of a first radius 63, concentric with bore 62. This first radius 63 is such as would interact with the cam follower portion 47 of the pawl 40 to not inhibit the ratchet engaging portion 43 of the pawl from engaging the ratchet discs 32 and 33 of spool 30. A radial protrusion 64 that is uniform along the axial length of the first cam surface 61 is provided. This protrusion 64 includes a cam surface portion of a second radius 65 relative to the axis of rotation 57. The second radius 65 is greater than said first radius 63 such as would interact with and lift the cam follower portion 47 of the pawl 40 in the direction of arrow 76 to the ratchet disengaged position and thereby prevent the ratchet engaging portion 43 of the pawl from engaging the ratchet discs 32 and 33 in the previously described manner.

As described, conventional gear driving means, driving gear 38 and driven gear 55, are employed to produce rotation of helically threaded shaft 51 in proportion to spool rotation. The helically threaded bore 62 of the cam element 60 is configured to cooperate with the helical thread of the shaft 51 such that the cam elememt may be carried by said shaft and have a predetermined amount of frictional contact therewith. In the preferred embodiment, the cam element 60 is comprised of a material having elastomeric properties, particularly a semi-rigid plastic, and also is configured with a slot 66 extending radially inward from cam surface 61 through bore 62 such that said slot extends in the direction of a diameter of the cam element 60 through a significant portion of the cross section of said cam element such that the sides of the slot 66 may be flexed outward relative to each other to allow cam element 60 to be snapped in place over helically threaded shaft 51. Further, the portions of the sides of the slot 66 corresponding with bore 62 exert a predetermined radially inward force on helically threaded shaft 51 such that the previously mentioned predetermined amount of frictional contact is acquired. This frictional contact tends to inhibit rotation of the cam element 60 relative to the helically threaded shaft 51 such that the unimpinged cam element 60 and the helically threaded shaft 51 tend to rotate as a single unit. In this manner, rotation of spool 30 corresponding with belt protraction or retraction is translated through driving gear 38, driven gear 55, helically threaded shaft 51, and, by frictional contact, cam element 60 to produce rotation thereof relative to the retractor frame 20. Rotational movement of cam element 60 about axis of rotation 57 relative to frame 20 comprises what is referred to as a first mode of cam operation. Said rotation operates to selectively locate said first 63 and second 65 radius portions of cam element 60 proximate said cam follower surface 48 in response to the direction of spool rotation.

Pawl control cam element 60 is further provided with stop means 67, a portion of protrusion 64 as will be later described, which interacts with portions of pawl 40 to impinge the cam element 60 in a determined manner, selectively preventing further rotational motion of cam element 60 relative to frame 20. The resistance to rotation of cam element 60 relative to helically threaded shaft 51, due to the frictional contact therebetween, is exceeded upon impingement of said stop means 67 with said portions of pawl 40. Such impingement produces relative rotation of cam element 60 with respect to the helically threaded shaft 51 such that further rotation of spool 30 results in a proportional axial translational motion of cam element 60 as defined by the helical thread. Said proportional translation is defined by a predetermined gear ratio of the driving gear 38 to the driven gear 55 and pitch of the thread of helically threaded shaft 51. This axial translational motion of cam element 60 comprises what is referred to as a second mode of cam element operation.

Belt retraction produces axial translation in the direction of arrow 73 such that cam element 60 will be positioned proximate the spring end 56 of the helically threaded shaft 51 in FIG. 2 when seat belt 12 is in the fully retracted condition, wound about spool 30. Cam element 60 translates in the direction of arrow 74 to a position proximate the gear end 54 of helically threaded shaft 51 as shown in FIG. 4 in response to seat belt 12 being fully protracted from spool 30. For all intermediate amounts of seat belt protraction, including protraction to a position of use, cam element 60 assumes a position along helically threaded shaft 51 between spring end 56 and gear end 54 substantially in proportion to the amount of said belt protraction. Said position is defined by the number of rotations of spool 30 from the fully belt-retracted condition, associated with positioning of cam element 60 at the spring end 56, adjusted for a less than one full rotation amount of lost axial motion due to rotation of cam element 60 relative to frame 20 between positions of impingement of stop means 67 with portions of pawl 40, associated with changes in direction of rotation of spool 30.

The radial protrusion 64 is configured such that a predetermined rotation of the cam surface 61 about the axis of rotation 57 in the direction of arrow 71 of FIG. 8, said rotation associated with retractive rotation of spool 30 and hereinafter referred to as retractive rotation thereof, would cause the cam follower portion 47 of the pawl 40, originally positioned at the previously described first radius 63, to be engaged by the rounded surface of the leading edge 68 of the radial protrusion 64 such that cam follower portion 47 would be lifted to the previously described second radius 65, that of the radially outward surface of the radial protrusion 64. More specifically, FIG. 7 shows the position of the cam follower portion 47 of pawl 40 corresponding with engagement with the first radius 63 of cam element 60. FIG. 8 shows the rotation of the rounded surface of leading edge 68 of protrusion 64 into engagement with cam follower surface 48 in response to retractive rotation of spool 30 such that the cam follower portion 47 is then lifted to a second radius 65, as particularly shown in FIG. 3.

The radial protrusion 64 is further provided with previously mentioned rotational stop means 67 extending radially outward therefrom and located opposite the leading edge 68. The rotational stop 67 is impinged by cam follower portion 47 of the pawl 40 as shown in FIG. 3 to prevent further rotation of the cam element 60 relative to frame 20 in the direction associated with retractive rotation of spool 30, shown by arrow 71, once said radial protrusion 64 has rotated to a position proximate said cam follower surface 48 such that said cam follower portion 47 has been lifted to the second radius 65, ratchet disengaged position. Impingement of said stop means 67 by the cam follower portion 47 of the pawl prevents further rotation of cam element 61 relative to frame 20 by overcoming the frictional resistance to rotation of cam element 61 relative to the helically threaded shaft 51, resulting in relative rotation therebetween producing axial translation of cam element 61 toward spring end 56 as shown by arrow 73 of FIGS. 6 and 2.

The rotational stop 67 is also impinged by latch engaging edge 46 of pawl 40, between ratchet engaging portions 43 as shown in FIG. 5, to prevent further rotation of the cam element 60 relative to frame 20 in the direction associated with protractive rotation of spool 30, shown by arrow 72, once cam element 60 has rotated such that first radius 63 positions of first cam element surface 61 are rotationally aligned with cam follower surface 48 of pawl 40. Again, impingement of said stop means 67 by the latch engaging edge 46 of the pawl prevents further rotation of cam element 61 relative to frame 20 by overcoming the frictional resistance to rotation of cam element 61 relative to the helically threaded shaft 51, resulting in relative rotation therebetween producing axial translation of cam element 61 toward gear end 54 shown by arrow 74 of FIG. 4.

The cam element 60 so far described is uniform in cross section along an extended axial length such that the surface thereof defines first cam surface 61. Cam element 60 is further provided with a second cam surface 70 axially adjacent and integral with said first cam surface 61. Said second cam surface 70 defines a uniform cylinder of the previously described second radius 65 such that when the cam element 60 is axially translated such that said second cam surface 70 is proximal to and operably aligned with the cam follower surface 48 of pawl 40, corresponding with the substantially fully belt-retracted condition, that it operates to retain the pawl 40 in the ratchet disengaged condition for all positions of rotation of cam element 60. Said second cam surface 70 is provided with an axial extension of the previously defined stop means 67. The axial extension of stop means 67 is further provided with a hook-like extension portion, pawl latch 69. Said pawl latch 69 functions to selectively latch said latch engaging edge 46 of pawl 40 and thereby retain the ratchet engaging portion 43 of pawl 40 in the disengaged position during protractive rotation to a position of use as shown in FIG. 5.

Second cam surface 70 is of a predetermined axial width such that said second cam surface is translationally aligned with cam follower portion 47 when seat belt 12 is fully retracted, as well as a predetermined number of spool rotations from the fully retracted condition. When so aligned, second cam surface 70 retains cam follower portion 47 at the second radius 65 position for all positions of rotation of cam element 60. In this condition, pawl 40 will be retained in the ratchet disengaged position during initial protraction, allowing pawl latch 69 to engage latch engaging edge 46. Once engaged, pawl latch 69 will retain pawl 40 in the ratchet disengaged position for any additional amounts of continuous protraction even though second cam surface 70 has axially translated so as to no longer be aligned with cam follower surface 48.

Accordingly, upon protraction to a position of use, the pawl and ratchet lock up assembly is activated by a slight retraction sufficient to rotate pawl latch 69 out of latching engagement with latch engaging edge 46 of pawl 40. Upon unlatching, pawl 40 is biased by pawl spring 44 toward the ratchet engaged position defined by alignment of first radius 63 portion of first cam surface 61 with cam follower surface 48. Additional retraction deactivates said lockup assembly by causing the second radius 65 of radial protrusion 64 to rotate into alignment with cam follower surface 48 thereby lifting cam follower portion 47 and pawl 40 to the ratchet disengaged position.

A better understanding of the cooperation of the elements of the present invention thus described will be afforded by a consideration of the cycle of operation of the retractor assembly.

OPERATION OF THE PREFERRED EXEMPLARY EMBODIMENT

Operation of the present invention produces a cycle of states of belt positioning and lock up. The initial state is the fully belt-retracted condition wherein belt 12 is stored wound about spool 30 and retained in said fully retracted condition by retracting spring 36. To use the present invention, a passenger would protract the seat belt 12 to a position of use, an amount of protraction such that the belt may be placed about the torso of the passenger with sufficient slack to manipulate the buckle tongue 13 into buckle 14. Release of the belt following buckling allows belt slack to be retracted by retractor spring 36 such that the belt is in a tensioned condition positioned about the torso of the passenger. In this position the belt spool is locked up against further protraction thereby providing passenger restraint in an emergency situation. Such lock-up continually prevents belt protraction until such time as the belt is unbuckled and reacquires a substantially fully retracted condition.

More specifically, in the initial, belt fully retracted and stored condition cam element 60 is axially positioned proximate the spring end 56 of helically threaded shaft 51 such that second cam surface 70 is in axial alignment with cam follower surface 48 of pawl 40. Cam follower portion 47 is retained at a second radius 65 for all positions of rotation of cam element 60 and thereby prevents lock-up at any time that the amount of belt protraction corresponds with the substantially belt-retracted condition. Upon a slight protraction of belt 12 from said substantially fully belt-retracted condition causes cam element 60 to rotate, the first mode of operation, in a unitary manner with helically threaded shaft 51 in the protractive direction shown by arrow 72 until such time as stop 67 engages the latch engaging edge 46 of pawl 40 as shown in FIG. 5. Since the pawl 40 is at a ratchet disengaged position in response to the second radius 65 of second cam surface 70, pawl latch 69 is located such that it may engage latch engaging edge 46 of pawl 40. Upon a subsequent predetermined amount of protraction of belt 12, said predetermined amount corresponding with a predetermined number of rotations of spool 30 which define the substantially fully belt-retracted condition and is determined in part by the width of the portion of second cam surface 70 alignable with cam follower surface 48, cam element 60 is axially translated toward the gear end 54 of helically threaded shaft 51 shown by arrow 74 of FIG. 4. such that second cam surface 70 is no longer in an operational alignment with cam follower portion 47 and thus pawl latch 69 becomes the sole means for retaining pawl 40 in the ratchet disengaged position during further protraction. Continued protraction of belt 12 produces continued axial translation of cam element 60 along helically threaded shaft 51 toward gear end 54 in the direction shown by arrow 74. Concurrently, pawl latch 69 translates along latch engaging edge 46 continually retaining pawl 40 in the ratchet disengaged position.

Once protracted to a position of use, a slight retraction of belt 12 activates the retractor lockup assembly by causing cam element 60 to be retractively rotated with helically threaded shaft 51 in the direction of arrow 71 such that pawl latch 69 rotates away from latch engaging edge 46 thereby releasing pawl 40 to rotate in response to pawl spring 44 to the ratchet engaged position as shown in FIG. 7. In the ratchet engaged position a slight protractive rotation of spool 30 causes one of the ratchet teeth of ratchet discs 32 and 33 to be rotated into locking engagement with ratchet engaging portion 43 of pawl 40 thereby causing passenger restraining retractor lockup.

Continued retractive rotation causes further rotational motion of cam element 60 in the direction of arrow 71 such that the rounded surface of leading edge 68 of radial protrusion 64 becomes aligned and interacts with cam follower surface 48 to lift it from said first radius is 63 to said radius 65 as shown in FIG. 8 thereby causing pawl 40 to be rotated from a ratchet engaged position to the ratchet disengaged position. This enables spool 30 to continue to retractively rotate without ratcheting of ratchet engaging portions 43 upon ratchet discs 32 33, reducing drag.

Continued retraction in excess of that associated with less than one rotation of the helically threaded shaft 51 causes the stop means 67 of cam element 60 to be rotated proximate to and thus be impinged by cam follower portion 47 as shown in FIG. 3 thereby preventing further rotation of cam element 60 in the direction of arrow 71 relative to frame 20. Continued retraction produces axial translation of cam element 60 toward spring end 56 of helically threaded shaft 51. Attempted protraction at any point prior to belt 12 being retracted to the substantially fully retracted condition causes cam element 60 to be rotated in the protractive direction shown by arrow 72 of FIG. 7 such that cam follower portion 47 is released from the second radius 65 of protrusion 64 to first radius 63 and assumes the ratchet engaged position such that ratchet engaging portions 43 of pawl 40 engage the ratchet teeth of ratchet discs 32 and 33 thereby repeatedly causing lock-up preventing further protraction.

Retraction to an amount of belt protraction corresponding with the substantially fully belt retracted condition causes second cam surface 70 to once again become axially aligned with cam follower portion 47 as shown in FIG. 2 and corresponding with a return to the initial condition which allows belt protraction to a position of use.

Having thus described a preferred exemplary embodiment of an automatic locking retractor with unitary pawl control means in accordance with the present invention, as well as its operation, it should be apparent to those skilled in the art that various additional alternative embodiments, adaptions, and modifications can be made within the scope and spirit of the present invention which is defined by the following claims.

I claim:

1. In a locking seat belt retractor having a frame, a spool carried by said frame and rotatably journalled thereto, a seat belt fixedly attached to said spool and windably retracted thereby, a biasing spring for rotatably biasing said spool to retract said belt, at least one multi-toothed ratchet disc rotatable with said spool, a pawl having a ratchet engaging portion for engaging said multi-toothed ratchet disc to lock said spool, said pawl being mounted for movement between ratchet engaged and ratchet disengaged positions, and means for moving said pawl to said ratchet engaged position, the improvement comprising the provision of:

unitary pawl control means for interaction with said pawl for inhibiting pawl motion towards said ratchet engaged position in response initially to a pre-determined minimum amount of protractive rotation of said spool to place said belt in a position of use and, only after said minimum amount of protraction has been exceeded, to the direction of rotation of said spool as the unwound belt is placed in use.

2. In a locking seat belt retractor having a frame, a spool carried by said frame and rotatably journalled thereto, a seat belt fixedly attached to said spool and windably retracted thereby, a biasing spring for rotatably biasing said spool to retract said belt, at least one multi-toothed ratchet disc rotatable with said spool, a pawl having a ratchet engaging portion for engaging said multi-toothed ratchet disc to lock said spool, said pawl being mounted for movement between ratchet engaged and ratchet disengaged positions, and means for moving said pawl to said ratchet engaged position, the improvement comprising the provision of:

unitary pawl control means for interaction with said pawl for inhibiting pawl motion toward said ratchet engaged position in response initially to the amount of protractive rotation of said spool as said belt is unwound toward a position of use and thereafter to the direction of rotation of said spool as the unwound belt is placed in use, wherein said unitary pawl control means further comprises means for providing said element with a first rotational mode of motion to control pawl movement toward said ratchet engaged position in response to the direction of rotation of said spool and a second translative mode of motion to control pawl movement toward said ratchet engaged position in response to the amount of protractive rotation of said spool.

3. In a locking seat belt retractor having a frame, a spool carried by said frame and rotatably journalled thereto, a seat belt fixedly attached to said spool and windably retracted thereby, a biasing spring for rotatably biasing said spool to retract said belt, at least one multi-toothed ratchet disc integral with said spool, a pawl having a ratchet engaging portion for engaging said multi-toothed ratchet disc, said pawl being rotatably mounted to said frame and having a limited rotation between ratchet engaged and ratchet disengaged positions, a pawl biasing spring for biasing said pawl to said ratchet engaged position, the improvement comprising the provision of:

unitary pawl control means interactive with said pawl for inhibiting pawl motion toward said ratchet engaged position in response to both the direction of rotation of said spool as said belt is placed in use and to the amount of protractive rotation of said spool during protraction and retraction relative to a substantially fully wound condition, wherein said unitary pawl control means comprises a single piece cam element, means for mounting sid element for cooperating with said pawl, and means for providing said element with a first mode of motion to control pawl rotation toward said ratchet engaged position in response to the direction of rotation of said spool and a second mode of motion to control pawl rotation toward said ratchet engaged position in response to the amount of protractive rotation of said spool, and wherein said means for providing said element with said first and second modes of motion is so provided that said first mode of motion of said element is rotative and said second mode of motion of said element is translative.

4. In a locking seat belt retractor having a frame, a spool carried by said frame and rotatably journalled thereto, a seat belt fixedly attached to said spool and windably retracted thereby, a biasing spring for rotatably biasing said spool to retract said belt, at least one multi-toothed ratchet disc integral with said spool, a pawl having a ratchet engaging portion for engaging said multi-toothed ratchet disc, said pawl being rotatably mounted to said frame and having a limited rotation between ratchet engaged and ratchet disengaged positions, a pawl biasing spring for biasing said pawl to said ratchet engaged position, the improvement comprising the provision of:

unitary pawl control means interactive with said pawl for inhibiting pawl motion toward said ratchet engaged position in response to both the direction of rotation of said spool as said belt is placed in use and to the maount of protractive rotation of said spool during protraction and retraction relative to a substantially fully wound condition, a helically threaded shaft driven by said spool for operably carrying said improved pawl control means and wherein said improved pawl control means is comprised of a single cam element, said cam element having a threaded bore extending therethrough such that said cam element is carried by said helically threaded shaft, said cam element and said helically threaded shaft having a predetermined amount of frictional, interaction such that rotation of said helically threaded shaft in response to belt protraction or retraction causes said cam element to be rotated therewith, said cam element being further provided with a stop means interacting with said pawl whereby said stop engages said pawl at a predetermined position of rotation to prevent further rotation of said cam element by exceeding the frictional resistance to rotation of said cam element relative to said helically threaded shaft and thereby causing axially translative motion of said cam element relative to said helically threaded shaft.

5. The provision of an improved pawl control means of single piece construction for preventing locking engagement of a seat belt retractor spool locking pawl with a ratchet disc integral with said spool, said locking engagement locking said spool against protractive rotation, said pawl control means comprising:

a single piece cam element, means for mounting said element for cooperating with said pawl and means for providing said element with a first rotational mode of motion to control pawl movement toward said ratchet engaged position in response to the direction of rotation of said spool and a second translative mode of motion to control pawl movement toward said ratchet engaged position in response to the amount of protractive rotation of said spool whereby said control means operates to prevent said locking engagement in response to both the direction of rotation of said spool and the amount of protractive rotation of said spool.

6. The provision of an improved pawl control means for controlling movement of the pawl of a locking seat belt retractor having a spool upon which a seat belt is wound, comprising: a single bi-functional cam element and means for causing said element to be interactive with said pawl in response to both the extent of spool rotation to inhibit motion of said pawl to prevent locking of said retractor during initial protractive rotation of said spool of a pre-determined minimum amount to place said seat belt in a position of use initiated from a substantially fully belt-retracted condition and thereafter, and only after said minimum amount of protraction has been exceeded, in response to a slight rewind rotation of said spool as the safety belt is placed in use.

7. In a locking seat belt retractor having a frame, a spool carried by said frame and rotatably journalled thereto, a seat belt fixedly attached to said spool and windably retracted thereby, a spool biasing spring for rotatably biasing said spool to retract said belt, at least one multi-toothed ratchet disc turnable with said spool, a pawl having a ratchet engaging portion for engaging said multi-toothed ratchet disc to prevent spool rotation, said pawl being mounted for movement between ratchet engaged and ratchet disengaged positions, said pawl and multi-toothed ratchet disc together comprising a ratchet assembly for selectively locking up said retractor for preventing belt protraction and thereby providing passenger restraint, the improvement comprising the provision of:

unitary pawl control means for selectively inhibiting pawl motion toward said ratchet engaged position during protractive rotation of said spool corresponding with the belt being protracted form a fully wound position to a position of use until a slight retractive rotation of said spool as said belt is placed in use activates said pawl to a ratchet engageable position for locking said spool against further protraction, and upon subsequent spool retractive rotation, again moves said pawl to the ratchet disengaged position, a helically threaded shaft driven by said spool for operably carrying said improved pawl control means and wherein said improved pawl control means is comprised of a single cam element, said cam element having a threaded bore extending therethrough and is mounted by said bore on a threaded portion of said helically threaded shaft, said cam element and said helically threaded shaft having a predetermined amount of frictional interaction such that rotation of said helically threaded shaft in response to belt protraction or retraction causes said cam element to be rotated therewith, said cam element being further provided with a stop means interacting with said pawl whereby said stop engages said pawl at a predetermined position of rotation to prevent further rotation of said cam element by exceeding the frictional resistance to rotation of said cam element relative to said helically threaded shaft and thereby causing axially translative motion of said cam element relative to said helically threaded shaft.

* * * * *